UNITED STATES PATENT OFFICE.

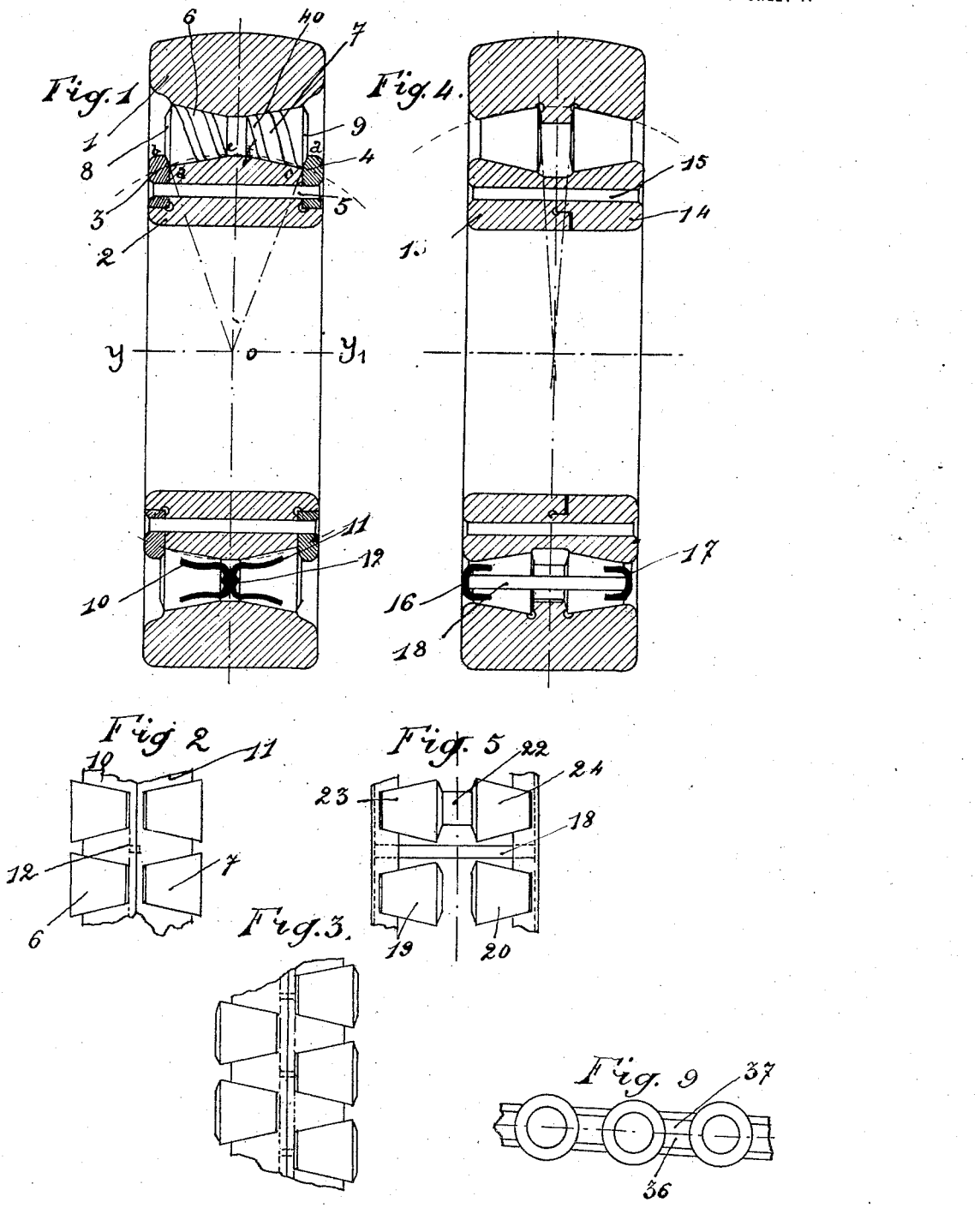

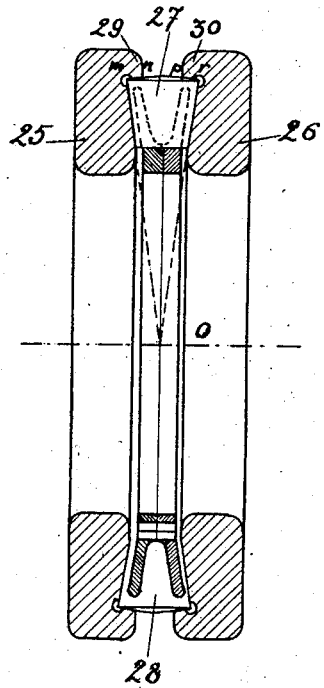
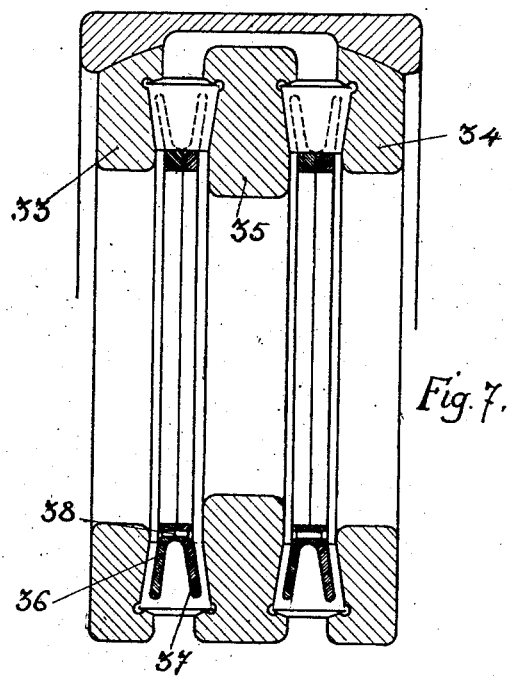
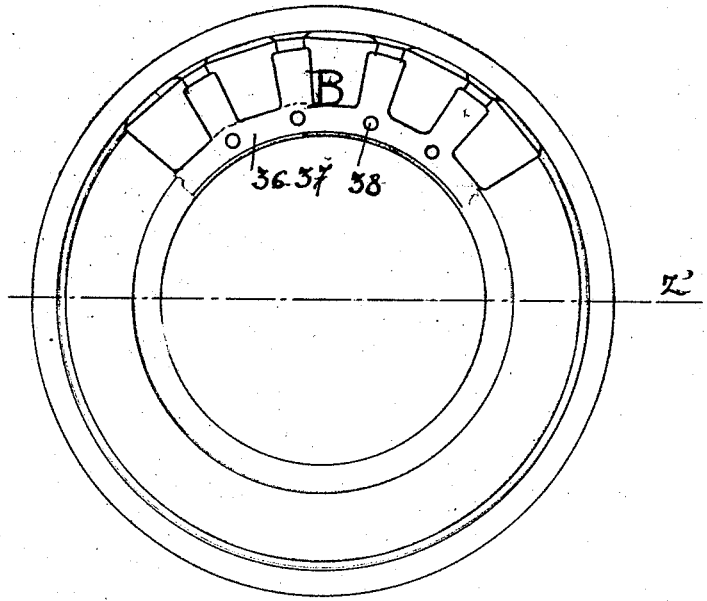

GEORGES L. BOULISSIERE, OF PUTEAUX, FRANCE.

ROLLER BEARING FOR RADIAL AND THRUST LOADS.

1,411,837.   Specification of Letters Patent.   Patented Apr. 4, 1922.

Application filed August 11, 1920. Serial No. 402,813.

*To all whom it may concern:*

Be it known that I, GEORGES LAZARE BOULISSIERE, a citizen of the French Republic, residing at #32 Rue Parmentier, Puteaux, Seine, France, have invented a new and useful Roller Bearing for Radial and Thrust Loads, of which the following is a specification.

The invention relates to an improved system of roller bearings that can also be used as thrust blocks. The system is characterized by the combination of taper rollers or rollers in the shape of truncated cones and of circular metal cages provided on their circumference with cellular seats in order to keep the proper distance apart of the rollers.

They can be applied either to bearings with concentric rings or to rollers with juxtaposed rims forming single or double thrust blocks.

The system according to the invention is simple and strong. Moreover, the shape of the rollers is so calculated that the paths described should be in accordance with the theoretical paths in each type of application. It follows that the working of the system in question makes it possible to absorb normally the smallest possible amount of energy on the shaft.

In the accompanying drawing given by way of example—

Figure 1 shows a bearing system with taper rollers between concentric rims, with a metal cage keeping the distance between the rollers.

Figure 2 is a plan of the above mentioned cage.

Figure 3 a modified shape of the cage of Figure 2.

Figure 4 a system of bearings with taper rollers similar to that of Figure 1, with modifications in the supporting rings and in the shape of the metal cage.

Figure 5 is a plan of the cage of the system of Figure 1, with two shapes of rollers that can be used in it.

Figure 6 is a system of bearing with taper rollers between rims arranged side by side forming a single thrust block.

Figure 7 a system as above between rims arranged side by side forming a double thrust.

Figure 8 is a front elevation of the thrust blocks in which is shown the method of holding the taper rollers, utilized for the thrust block in Figures 6 and 7.

Figure 9 is a bottom view of the cages staying or bracing the rollers of Figure 7.

The accompanying drawings correspond to a certain number of applications of taper rollers, that is to say rollers having the shape of a truncated cone, suitably held at a constant distance apart owing to metal cages provided with cells with which they engage, or owing to rims provided with fingers at their periphery.

Figure 1 shows the application of rollers of that type, inserted between two concentric rings, on outside ring 1 and a central ring 2, the latter having on either side rims 3 and 4 stayed and secured to the said ring by means of rods 5, the heads of which form rivets.

The taper rollers such as 6 and 7, are arranged symmetrically of the transverse axis of the set of rings (the transverse width of which is a function of the pressure exercised by the shaft), so that the small bases of the cone are arranged inside. These rollers rest on bearing surfaces of conjugated cross-section, provided on the one hand, on the outside of the supporting ring 2 and in the interior of the outer ring 1.

The large bases of the cones constituting the rollers, have greatly flattened conical surfaces 8 and 9 which press against the stop rings 3 and 4 along the straight lins $ab$ and $cd$, the extensions of which are arranged so as to converge at $o$ which is the centre of the system.

Moreover, the points $e$ and $f$ corresponding to the ends of the generatrices of contact of the roller cones with the bearing surfaces of the ring 2, are arranged so as to be situated on a circle of a radius $oe=of=oa=oc$.

Such an arrangement ensures perfect symmetry of the rotating whole and guarantees a perfect bearing complying with the theoretical conditions that every apparatus of this kind has to fulfill.

The upper part of Figure 1 which is above the axis of the shaft YY' corresponds, for the outer ring, to the ball and socket joint side, whilst the other corresponds to the simple side.

At 10 and 11 are shown two rims connected together by rivets such as 12 and having mild steel plates suitably folded to the general shape of a U, the branches of which diverge outwardly.

The plan (Figure 2) shows the way in which rollers such as 6 and 7 are held apart.

Each of the rims 10 and 11 has seats of suitable cross-section with which the various rollers engage.

The latter can be, moreover, arranged side by side, in twos (Figure 2) or in a staggered order (Figure 3).

A modified construction of the bearings of Figure 1 is shown in Figure 4. This second system differs from the first in the following:

1. The position of the rollers is reversed, the small bases pointing outwards, and the large ones inwards.

2. The supporting rims 3 and 4 are done away with and replaced by a suitable cross-section of the bearing surfaces.

3. The central ring made in one piece is replaced by two half rings with offset joints 13 and 14 held by the spindle-rivet 15.

4. The two rims constituting the cage driving the rollers, are no longer arranged side by side but placed on the outer faces (small bases) of the rollers according to 16 and 17, and stayed parallel to the spindle by pins-rivets such as 18 (plan Figure 5).

5. Finally, the rollers can be independent like the rollers 19 and 20 of Figure 5, or connected together by axial extensions such as 22, like the rollers 23 and 24 (Figure 5).

Like in the preceding case, the part of the bearing above the axis YY' corresponds, for the outer ring, to the ball and socket joint side, whilst the part above corresponds to a simple side.

Figure 6 shows a modification in the method of application of taper rollers, corresponding to their use in a single thrust block. In such a case they are interposed between the juxtaposed rims 25 and 26.

The generatrices of the truncated cones constituting the rollers such as 27 and 28 have been given a suitable inclination so that they all converge to the point O, centre of the bearing. In this way, good working of the apparatus is ensured, and a guarantee is obtained that the paths described are in accordance with the geometrical conditions.

On their inner faces and at their peripheries, the rings 25 and 26 are provided with annular projections 29 and 30 which are intended to hold the rollers. The surface of the said projections in contact with the rollers is constituted by arcs of a circle of the radius $om=on=op=or$. spect to the associated automobile;

The large base of the roller such as 27 has a flat horizontal part connecting by means of two conical surfaces to the body of the element. The arrangement provided is such that the latter have only one point of contact, at $n$ and $p$, with each of the outer circular cross-sections of the projections 29 and 30. In that way, the loss of energy by friction proper, due to the system of thrust block, is rendered very small.

Figure 8 shows at B, above the axis ZZ', a lateral view of the bearing thus constituted.

Figure 7 shows a modification of the system of bearing represented in Figure 6, this modified construction corresponding to a double thrust block.

In the latter thrust block, the rims 25 and 26 are replaced by outer rims 33 and 34 between which is inserted the central rim 35, at either side of which are arranged two series of rollers.

The upper part of the system corresponds to the ball and socket joint side, whilst the bottom part corresponds to the simple side.

In the two systems of bearings in Figures 7 and 8, the method of staying the rollers which has been provided, is as follows:

The cage which spaces the rollers apart consists of two rings 36 and 37 of sheet metal steel placed side by side and connected together by means of rivets 38, or the cage may be made in a single piece of cast brass or bronze.

Figure 8 is a side elevation of the system thus constituted, whilst Figure 9 is a plan.

It will be easy to see that the flanges of the rims 36 and 37 have solutions of continuity on their circumference, which constitutes seats with which the rollers engage.

It must be pointed out that in all the applications described the rollers, or their supporting or bearing surfaces, could be provided with helical grooves with right or left hand thread such as 40 (Figure 1) so as to reduce considerably the friction forces and to facilitate lubrication.

Any modification in details can be made in applying the system of conical or taper rollers, without departing from the spirit of the invention.

I claim:

A roller bearing and thrust block structure comprising concentric inner and outer rings arranged in spaced relation and having their opposing surfaces bevelled to form annular races, truncated conical rollers arranged in said races, means to hold the rollers in place, and cross sectionally U-shaped rings arranged in said races, secured together, and having notches in their branches in which said rollers are revolubly fitted.

In witness whereof I affix my signature.

G. L. BOULISSIERE.